United States Patent [19]

Schmidt

[11] Patent Number: 5,044,246

[45] Date of Patent: Sep. 3, 1991

[54] DEVICE FOR TRANSFERRING THE VIBRATIONS OF STRINGS TO THE WALLS OF A HOLLOW BODY

[76] Inventor: Karlwalter Schmidt, Kapellenweg 17, D-8990 Lindau, Fed. Rep. of Germany

[21] Appl. No.: 415,280

[22] PCT Filed: Dec. 29, 1988

[86] PCT No.: PCT/DE88/00785

§ 371 Date: Aug. 17, 1989

§ 102(e) Date: Aug. 17, 1989

[87] PCT Pub. No.: WO89/07308

PCT Pub. Date: Aug. 10, 1989

[30] Foreign Application Priority Data

Jan. 27, 1988 [DE] Fed. Rep. of Germany ....... 3802245

[51] Int. Cl.[5] .............................................. G03B 3/00

[52] U.S. Cl. .................................................. 84/291

[58] Field of Search ................. 84/267, 268, 269, 270, 84/274, 275, 284, 285, 291, 296, 292

[56] References Cited

U.S. PATENT DOCUMENTS 143,117 9/1873 Belknap .......................... 84/277 X
775,658 11/1904 Isbell .................................... 84/268
1,043,015 10/1912 Junker .................................. 84/296
2,046,331 7/1936 Loar ................................. 84/267 X

FOREIGN PATENT DOCUMENTS 115075 9/1969 Denmark .
2740605 3/1979 Fed. Rep. of Germany .

*Primary Examiner*—Brian W. Brown
*Attorney, Agent, or Firm*—Ladas & Parry

[57] ABSTRACT

The invention relates to a device for the transfer of string vibrations to the outer walls of a hollow body. The strings are stretched over a bridge in the conventional manner and the bridge transfers the movements to a mobile wall of the hollow body. This narrow wall with a relatively small surface does not mainly vibrate the surrounding air and instead transfers via supports the string vibrations to two large-area hollow body walls positioned below it. The bearing points of the bridge on the hollow body narrow wall, the hollow body walls and the supports are arranged in such a way that in the case of a bridge vibrating movement direction following the string vibrations, the large surfaces of the hollow body are moved in opposite directions. The large surfaces mainly vibrate the surrounding air, on the one hand directly through the movements thereof on the hollow body surface and on the other hand indirectly by the pumping action of the oppositely moving large surfaces on the air within the hollow body, which in turn excite the ambient air by corresponding wall openings. The transfer mechanism permits larger vibrating walls with larger vibration amplitudes and a larger hollow body for comparable instruments, so that the strings give more sound for the same excitation energy.

12 Claims, 2 Drawing Sheets

DEVICE FOR TRANSFERRING THE VIBRATIONS OF STRINGS TO THE WALLS OF A HOLLOW BODY

The invention relates to a device for transferring the vibration of strings to the walls of a hollow body according to the preamble of claim 1.

TECHNICAL FIELD

In modern string instruments the vibrations of the strings are emitted or irradiated from those walls of the instrument body on which is located the bridge over which the strings are stretched. This wall is generally called the covering board. In the case of string instruments the vibrations are passed by a sound post to the hollow body wall or sound board facing the covering board and emitted or irradiated by the same. The covering and sound boards are kept spaced by ribs or sides and closed to form a hollow body. This arrangement of the strings, bridge and emitting walls suffers from the disadvantage that the tension introduced into the covering board by the bridge by the strings stretched over it loads the covering board precisely at the point and in the direction where it can best carry out the vibrations necessary for the emission of sounds. The pretension limits the capacity to move and consequently also the sound emission.

BACKGROUND OF THE INVENTION

The freedom of movement of the covering board in string instruments is further restricted by a curvature of said board in opposition to the string tension. It necessarily stiffens the covering board in such a way that it is not pressed in by the string tensions. A further restriction to the freedom of movement of the covering board results from the fact that bass bars are required on string instruments for transferring vibrations to the complete covering board surface and for supporting the string tension. A further limitation to the freedom of movement of the covering board and in particular its size and that of the instrument cavity results from the indentations alongside the bridge required for the freedom of movement of the bow in string instruments. In order to permit an adequate movement of the covering board sound holes must be formed between the indentations and the bridge.

The problem of the present invention is therefore to provide an arrangement of the walls and supports in which the string tension introduced via the bridge only insignificantly stresses the sound-emitting walls in the direction of the vibrating movement thereof, the necessary stiffenings only have a minimum detrimental influence on the movements of said walls and a large-volume instrument body is permitted.

The tension of the strings stretched over the bridge is at right angles to the movement direction of the sound-emitting walls of the instrument body, i.e. introduction takes place in the direction of the main plane of these walls. Therefore the walls are not pretensioned in the vibration movement direction and the vibration amplitudes are not limited. These walls do not have to be curved for static reasons. They can be made planar and then vibrate better for the emission of sound. There is also an arrangement of the sound-emitting walls below the strings and the bridge, which obviates any need for an indentation in the walls for the freedom of movement of the bow. Due to the statically stiffer leading off of the string tensions, it is possible to support higher tension levels, the bridge can be made higher and consequently the transmission ratio of the string vibrating movements to the movements of the second-emitting walls can be increased.

As a result of the measures according to the invention for the same excitation energy and vibration energy of the strings, due to larger vibrating walls with larger vibration amplitudes and a larger instrument hollow body, there is a better vibration of the ambient air and consequently more sound can be produced than in comparable string instruments.

The arrangement of the holes 14 in the centre of the hollow body side walls 6 and 9 according to claim 2 gives a maximum spacing between individual holes, considered round the hollow body, whilst simultaneously reducing the bending resistance of the walls. The large reciprocal spacing of the holes prevents an equalization of the pressure of the atmospheric pressure vibrations passing out of the holes around the instrument body to the longwave, low notes, which are lower than in comparable string instruments.

The design of the supports according to claim 3 improves the transfer of the string vibrating movement introduced in punctiform manner onto the upright wall on the upright point of the bridge to the entire surface of the large hollow body sides, without the wide supports restricting the freedom of movement of the sides. The construction of the walls according to claim 4 reduces the moving masses. The construction of the walls according to claims 5 and 6 has the same effect.

The notch in the upright surface of the bridge improves the bendability of the wall along the indicated line. During the further transfer of the string vibrations from the bridge on the upright wall into the supports, said wall is bent along this line. The smaller the wall stiffness at this point, the less impedance to the transfer of the string movements.

THE DRAWINGS

The invention is described in greater detail hereinafter relative to a non-limitative embodiment and the attached drawings, wherein show:

FIG. 1 A perspective view with a section through a string instrument hollow body at the point where it is possible to see the arrangement of the components for transferring the string vibrating movements to the hollow body wall.

FIG. 2 A side view of an inventive instrument body.

FIG. 3 A section through the instrument body level with the bridge.

FIG. 4 A view of the instrument body on the bridge upright surface.

DETAILED DESCRIPTION

Figure 1:
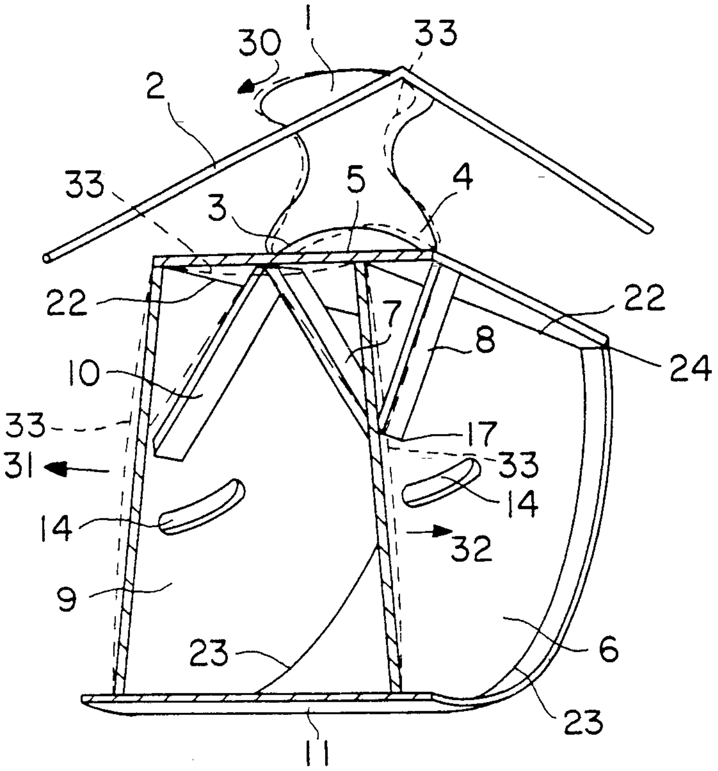

FIG. 1 shows a string 2 stretched over the bridge 1, whose feet or bases 3 and 4 are located on the bridge supporting wall 5. On the side of wall 5 remote from bridge 1, the hollow body side wall 6 stands up from the bridge supporting wall 5 between feet 3 and 4 of the said bridge 1. Starting from the feet 3 and 4 of bridge 1, supports 7 and 8 forming triangles pass towards the surface of side wall 6 and are in contact therewith at intersection 17. A further hollow body side wall 9 is located laterally outside the feet 3 and 4 on the side of the bridge supporting wall 5 remote from the bridge. Starting from the foot 3 of bridge 1 located between walls 6 and 9, support 10 passes towards the surface of wall 9 and is in contact therewith at point 18.

Each wall 6 and 9 has a straight side 22 and a curved side 23. On straight side 22 they are kept spaced by the bridge upright wall 5 and on the curved side 23 by rib 11. At the corners 24 formed by walls 5, 6, 9 and 11, the tail-piece 12 is located on one side and the neck 13 on the other.

The forces introduced by neck 13, tail-piece 12 and bridge 1 into the instrument hollow body stress wall 5 and in particular the sound-emitting walls 6 and 9 only in a direction parallel to the surfaces thereof from the end face. There is no restriction to the mobility thereof as a diaphragm.

A vibrating movement of string 2, e.g. in the direction of arrow 30 brings about a movement of bridge 1 in such a way that foot 3 presses in wall 5 and foot 4 raises wall 5. Consequently supports 7 and 10 are forced downwards and bulge walls 6 and 9 in the outwards direction following arrows 31 and 32. Support 8 is raised at this point through the upward movement of base 4 and wall 5 and draws wall 6 downwards in the direction of arrow 32 in the same direction as support 7.

The deflection movement of bridge 1 and walls 5, 6 and 7, as well as supports 7, 8 and 10 is represented by the broken line 33. Components 1, 5, 6, 7, 8, 9 and 10 move in the opposite direction, when string 2 is moved in opposition to arrow 30.

During the movement of wall 6 in the direction of arrow 32 and wall 9 in the direction of arrow 31, the volume of the instrument hollow body is increased. Therefore air is sucked from the outside through the holes 14 into the hollow body or, is blown out in the case of the opposite movement direction. As walls 6 and 9 have a large surface and are not restricted in their movement direction by pretensions and bulges, this takes place in an effective manner, as does the transfer of the movements of the walls 6 and 9 on the outside thereof directly to the ambient air.

Figure 2:
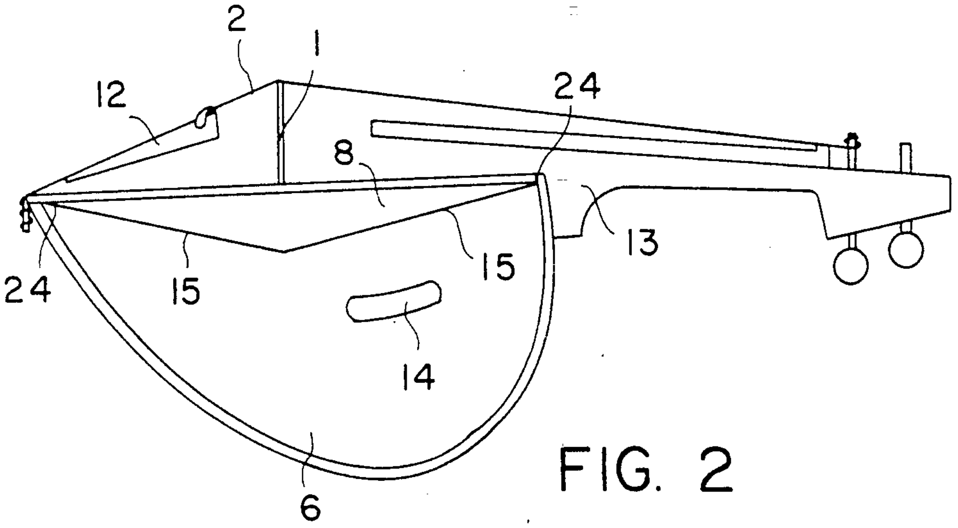

FIG. 2 shows a construction of support 8 corresponding to claim 3. Support 8 is so wide that it extends up to the corners 24, which are formed by walls 5, 6, 9 and 11. Its height decreases towards the corners 24 between contact line 15 with the bridge upright wall 5 and contact line 21 with wall 6, starting from the intersection 17 below bridge 1. Therefore the movement of support 8 is not only imparted to wall 6 at one point 17, but instead along line 15 where support 8 is in contact with wall 6. The latter is no longer bulged in tent-like manner, but instead assumes an umbrella-like configuration. In addition, the concentrated load is distributed by the bars on the material surface. The larger bulge of wall 9 picks up more air and consequently the string instrument produces more sound.

Figure 3:
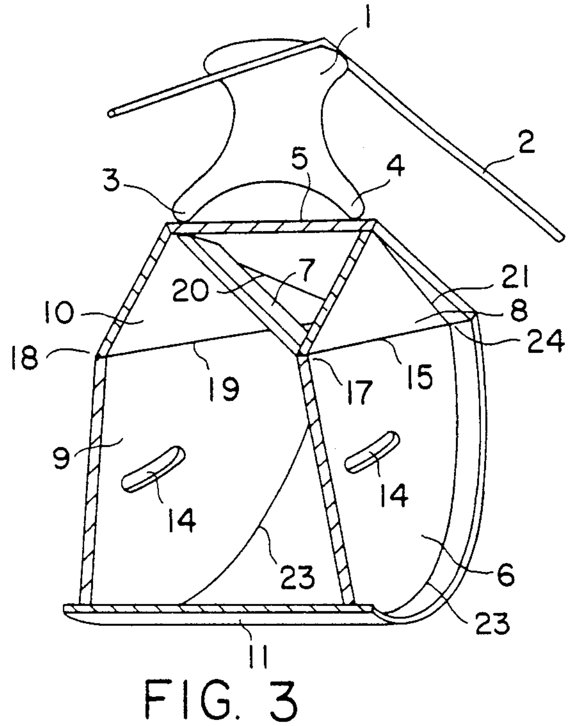

A further development of the string vibration transfer means is shown in FIG. 3 corresponding to claim 6. The transfer of the string vibrations to walls 6 and 9 is improved through the reduction of the moving masses. This reduction of the moving masses is obtained here by omitting the parts of walls 5, 6 and 9 referred to in claim 6.

Figure 4:
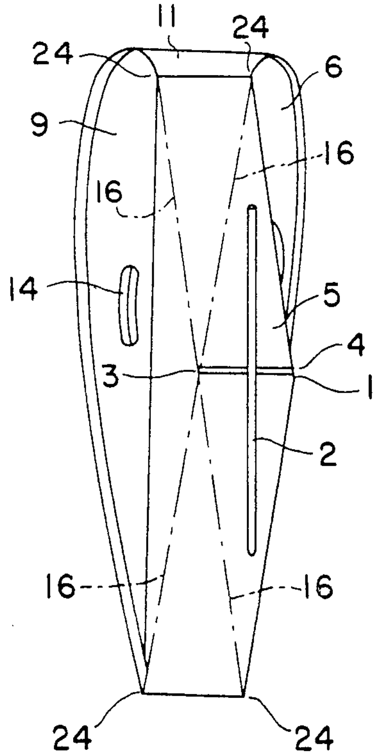

An improvement to the vibration transfer from spring 2 to walls 6 and 9 comprises making wall 5, on which bridge 1 is located, more flexible due to a notch and passes along the broken lines 16 shown in FIG. 4. These lines pass from foot 3 of bridge 1, located between walls 6 and 9 and pass to the comers 24 formed by walls 5, 6, 9 and 11. During the transfer of string vibrations wall 5 is bent along these lines. The notch reduces the moment of resistance of wall 5 at this point. The movements caused there by bridge 1 are not supported by the flexurally stiff wall 5 and are instead passed on.

I claim:

1. A device for the propagation of vibrating movements of strings (2) of a musical instrument having two oppositely arranged sound emitting main walls (6,9) in a hollow instrument body and having a bridge supporting wall (5), the strings being stretched over a bridge (1) mounted at two bridge feet (3,4) to said bridge supporting wall, said device comprising supports (7,8,10) emanating from a lower side of said bridge supporting wall (5) at locations directly opposite said bridge feet (3,4) and leading downwards to both sound emitting main walls (6,9), which main walls (6,9) are arranged as sidewalls of the musical instrument body and also emanate from the bridge supporting wall (5), one of said main walls (6 of FIG. 1) emanating from a location between the bridge feet (3,4) and the other of said main walls (9 of FIG. 1) emanating from a location exterior of the region between the bridge feet (3,4).

2. The device according to claim 1, wherein in a central part of at least one of said walls (5,6,9) is provided a sound hole (14).

3. The device according to claim 1, wherein at least two of the supports (8,10) emanating from the bridge supporting wall (5) and leading to a sound emitting main wall (6,9) extend into end corners (24) of the hollow instrument body formed by the meeting of the walls (5,6,9) which define said hollow body and have a decreasing width towards said corners (24).

4. The device according to claim 3, wherein the upper bridge supporting wall (5) is provided with notches (16) passing from a bridge foot (3,4) to each of said corners (24) of the hollow instrument body.

5. The device according to claim 1 wherein said main walls are generally planar.

6. A device for the propagation of vibrating movements of strings (2) of a musical instrument having two oppositely arranged sound emitting main walls (6,9) in a hollow instrument body and having a bridge supporting wall (5), the strings (2) being stretched over a bridge (1) mounted at two bridge feet (3,4) on said bridge supporting wall, said device comprising supports (7,8,10) emanating from a lower side of said bridge supporting wall (5) at locations directly opposite said bridge feet (3,4) and leading downwards to an upper edge (15,19) of both sound emitting main walls (6,9), which main walls (6,9) are arranged as sidewalls of the musical instrument body.

7. The device of claim 6, further including a lower wall (11) which joins said two sound emitting main walls.

8. The device according to claim 6, wherein each foot of the two bridge feet (3,4) is placed on a side edge of said bridge supporting wall (5).

9. A stringed musical instrument having a hollow instrument body and comprising:

(a) two oppositely arranged sound emitting main walls;
(b) a bridge supporting wall disposed adjacent said sound emitting walls;
(c) a bridge having feet mounted on said bridge supporting wall; and
(d) supporting walls attached to said bridge supporting wall on a side thereof directly opposite to said feet of said bridge, said supporting wall angling downward from said bridge supporting wall and joining said sound emitting main walls.

10. The stringed instrument of claim 9, wherein said sound emitting walls also join said bridge supporting wall at locations spaced from the feet of said bridge.

11. The stringed instrument of claim 10, wherein said sound emitting walls having a generally planar configuration, which, if extended toward said bridge supporting wall would pass through said bridge between its feet and adjacent said bridge, respectively.

12. The stringed instrument of claim 9, wherein said sound emitting walls having a generally planar configuration, which, if extended toward said bridge supporting wall, would pass through said bridge between its feet and adjacent said bridge, respectively.

* * * * *